Oct. 6, 1970  R. C. BUELER  3,532,390

CONTROL VALVE

Original Filed Aug. 17, 1967

INVENTOR
RICHARD C. BUELER
BY
Joseph E. Papin

United States Patent Office 3,532,390
Patented Oct. 6, 1970

3,532,390
CONTROL VALVE
Richard C. Bueler, Glendale, Mo., assignor to Wagner Electric Corporation, Newark, N.J., a corporation of Delaware
Continuation of application Ser. No. 661,408, Aug. 17, 1967. This application Aug. 22, 1969, Ser. No. 859,496
Int. Cl. B60t 8/26, 15/00
U.S. Cl. 303—6
32 Claims

ABSTRACT OF THE DISCLOSURE

A control valve including a proportioning member having a metering portion engageable with another metering portion of a control member to effect a metered application through said control valve of fluid pressure supplied thereto, and said control member being movable to disengage its metering portion to effect an unmetered application of the supplied fluid pressure upon the failure of another separately supplied fluid pressure acting on said control member to normally balance the first named supplied fluid pressure.

---

Figure 3:
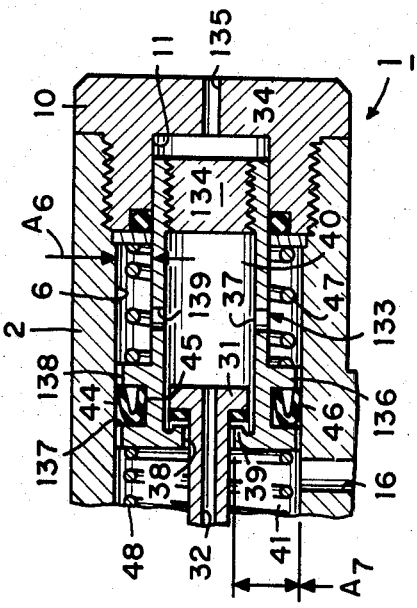

This application is a continuation of application Ser. No. 661,408 filed Aug. 17, 1967, now abandoned.

This invention relates in general to dual or split fluid pressure systems and in particular to control valves for controlling pressure fluid flow through one of said dual systems.

In the past, dual or split fluid pressure systems were provided with a control or driver warning valve which was responsive to a fluid pressure failure in one of the dual systems to light a driver warning or dash lamp and also with another control or proportioning valve which proportioned the fluid pressure in one of the dual systems delivered to one vehicle brake set. One of the disadvantageous or undesirable features of such past constructions was that the driver warning valves and proportioning valves were separate units, which not only affected the cost of manufacturing but also the cost of assembly, both of the valves per se and on the vehicle, and the utilization of such separate valve units also presented a space factor problem since under-the-hood space in modern vehicles is becoming critical. Another of the disadvantageous or undesirable features of such past constructions was that the proportioning valve continued to proportion the fluid pressure applied to the one vehicle brake set even though a failure had occurred in the portion of the dual system connected with the other vehicle brake set. And still another undesirable or disadvantageous feature of such past constructions was that since the two valves were separate, the inherent characteristics, such as structural arrangements and/or operational movements thereof, indigenous to each could not effectively combine or interrelate with one another.

The primary object of the present invention is to provide a control valve which overcomes the aforementioned disadvantageous or undesirable features, and this, as well as other objects and advantageous features of the present invention, will become apparent hereinafter.

Figure 2:
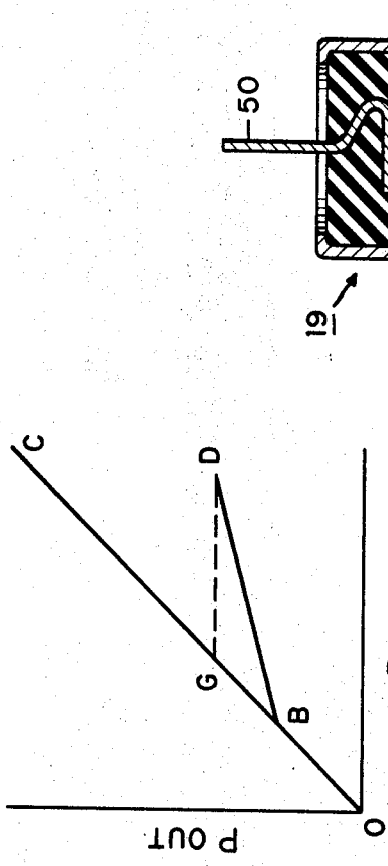
Figure 1:
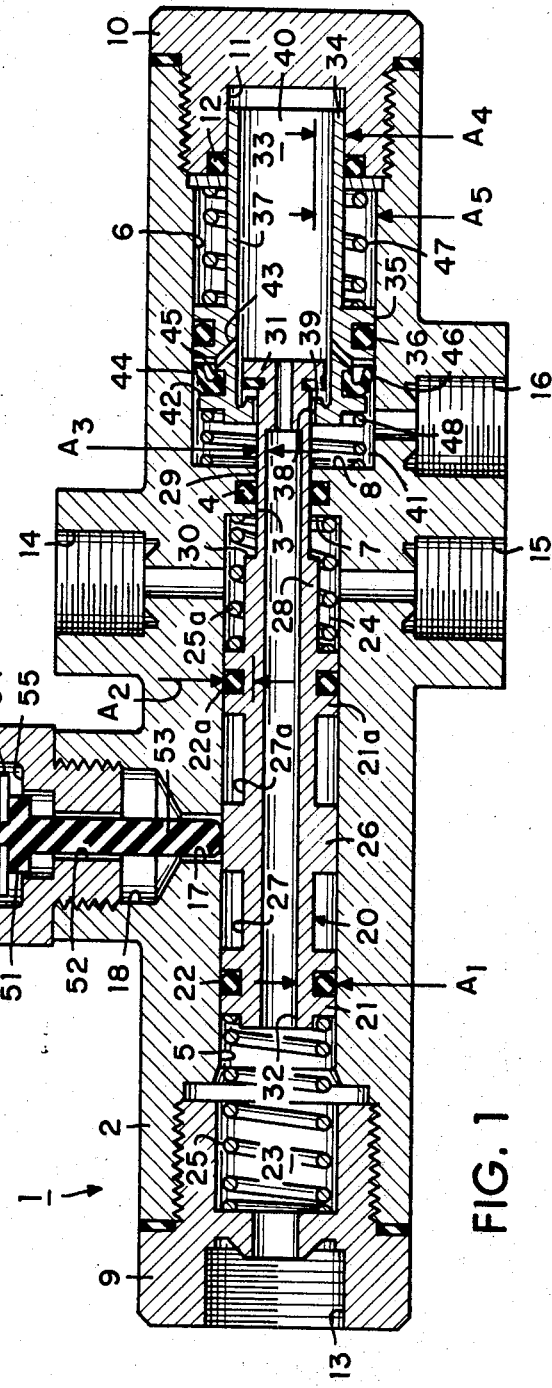

In the drawings wherein like numerals refer to like parts wherever they occur:

FIG. 1 is a sectional view showing a control valve embodying the present invention in cross-section, FIG. 2 is a graphical representation illustrating the output pressure effected by the control valve of FIG. 1 in response to the input pressure supplied thereto, and FIG. 3 is a fragmentary view showing an alternate construction of the proportioning portion of the control valve of FIG. 1 in cross-section.

Briefly, one aspect of the present invention comprises a control valve having a pair of relatively movable members for controlling the application therethrough of a supplied fluid pressure, one of said members being movable in response to the supplied fluid pressure into metering engagement with the other of said members to effect a metered application of said supplied fluid pressure through said control valve, and said other member being movable to a position disengaged from said one member to effect an unmetered application through said control valve of the supplied fluid pressure upon the failure of another fluid pressure separately supplied to said other member for balancing the first named supplied fluid pressure.

Referring now to FIG. 1, a control valve, indicated generally at 1, is provided with a housing 2 having a bore 3 therein in which is disposed a seal 4. The bore 3 is interposed between opposed counterbores 5, 6, and opposed shoulders 7, 8 are defined at the juncture of said bore with said opposed counterbores, said counterbores being relieved at their outer ends to threadedly receive closure members or end plugs 9, 10. The closure member 10 is provided with a blind bore 11 substantially coaxial with the housing counterbore 6 and having a seal 12 disposed therein, and the closure member 9 is provided with an inlet port 13 connecting with the counterbore 5 adjacent the leftward end thereof and which is adapted to be connected with one fluid pressure generating chamber of a dual or split type master cylinder (not shown) of a type well known in the art. Another inlet port 14 is provided in the housing 2 intersecting with the counterbore 4 adjacent to the shoulder 7 and is adapted to be connected with the other fluid pressure generating chamber of the aforementioned dual or split type master cylinder. An outlet or delivery port 15, which is adapted for connection with one vehicle brake set (not shown), such as for instance the front brakes, is provided in the housing 2 connecting with the counterbore 5 adjacent to the shoulder 7 and in pressure fluid communication with the inlet port 14; however, as in similar prior art fluid pressure systems or circuits, this outlet port may alternatively be omitted from the valve construction where the inlet port 14 is connected in parallel between its fluid pressure generating chamber of the aforementioned split master cylinder and the one vehicle brake set. Another outlet or delivery port 16, which is adapted for connection with the other vehicle brake set (not shown), such as for instance the rear brakes, is also provided in the housing 2 intersecting the counterbore 6 adjacent to the shoulder 8. A crossbore 17 is provided in the housing 2 having one end intersecting the counterbore 5 adjacent the mid-portion thereof and the other end connecting with a cross-counterbore 18 which is threaded at its open end to receive an electrical switch mechanism indicated generally at 19, to be discussed hereinafter.

A switch actuating member or control piston, indicated generally at 20, is shown in its normal operating or centered position having opposed flanges 21, 21a with peripheral seals 22, 22a disposed therein slidably received in the housing counterbore 5 between the inlet ports 13, 14 and the housing crossbore 17, respectively. An inlet chamber 23 is defined in the housing counterbore 5 between the piston flange 21 and the closure member 9 in open pressure fluid communication with the inlet port 13, and said flange is provided with an annular effective area $A_1$ substantially defined by the sealing engagement of the seal 22 with the housing bore and responsive to fluid pressure in the chamber 23. Another inlet chamber 24 is defined in the housing counterbore 5 between the piston flange 22a and the shoulder 7 in open pressure fluid communication with the inlet port 14, and the flange 22a is provided with an annular effective area $A_2$ in the inlet chamber 24 opposed to and predeterminately less than the area $A_1$. Opposed centering or motion impeding springs 25, 25a are respectively interposed between the piston flanges 21, 21a and the closure member 9 and housing shoulder 7. The piston 20 is provided with a land 26 between the flanges 21, 21a which is slidable in the housing counterbore 5 and normally positioned beneath the housing cross-bore 17 when said piston is in its centered position, as shown, and locking grooves 27, 27a are provided in said piston on opposed sides of said land. Stepped extensions 28, 29 having an annular shoulder or abutment 30 therebetween for abutting engagement with the housing shoulder 7 are integrally provided on the piston flange 21a extending coaxially through the inlet chamber 24, and the extension 29 extends coaxially through the housing bore 3 in sealing engagement with the sealing member 4 disposed therein into the housing counterbore 6, said extension 29 having an annular effective area $A_3$ opposed to the area $A_1$ and substantially equal to the difference between the areas $A_1$, $A_2$. The free end of the extension 29 in the housing counterbore 6 is provided with a radially extending metering valve element or member 31 thereon, and an axial passage 32 is provided through the piston 20, the extensions 29, 30 thereof, and the valve member 31 between the inlet chamber 23 and the housing counterbore 6.

A proportioning member or metering piston 33 is provided with a sleeve portion 34 having one end slidably disposed in the blind bore 11 of the closure member 10 in sealing engagement with the seal 12, and a radially extending flange 35 having a peripheral seal 36 disposed therein is integrally provided on the sleeve portion 34 adjacent the other end thereof in sliding engagement with the housing counterbore 6. Stepped passages or bores 37, 38 having an annular shoulder or metering valve seat 39 defined therebetween are axially provided through the proportioning piston 33, the smaller stepped passage 38 being coaxial with the extension 30 and radially spaced therefrom, and the valve member 31 of the piston 20 being movable in the larger stepped passage 37 for metering or sealing engagement with the proportioning piston valve seat 39. The proportioning piston passage 37 and the closure member bore 11 define another inlet or intermediate chamber 40 rightwardly of the valve seat 39 and in open pressure fluid communication with the inlet chamber 23 through the piston passage 32, and an outlet chamber 41 is defined in the housing counterbore 6 between the housing shoulder 8 and the proportioning piston 33 in open pressure fluid communication with the outlet port 16. The proportioning piston 33 is also provided with an annular groove 42 in the periphery thereof adjacent to the flange 35, and a plurality of passages 43 in said piston are connected between said groove and the larger stepped passage 37. An annular sealing member or valve element 44 is received in the groove 42 having an inner sealing lip 45 in sealing engagement therewith and an outer sealing lip 46 in sealing engagement with the housing counterbore 6. A proportioning or metering spring 47 is interposed between the piston flange 35 and closure member 10 normally urging the valve seat 39 toward a position disengaged from the control piston valve element 31 to effect open pressure fluid communication between the chambers 40 and 41 through the proportioning piston stepped passage 38, and a return spring 48 of negligible compressive force is interposed between the proportioning piston 33 and the housing shoulder 8 in the chamber 41. It should be noted that the proportioning piston 33 is provided with an annular effective area $A_4$ defined between the periphery of the sleeve 34 and the piston passage 38 and responsive to the fluid pressure in the intermediate chamber 40. Another annular effective area $A_5$ is provided on the piston 33 in opposition to the area $A_4$ and defined between the housing counterbore 6 and the piston passage 38, said area $A_5$ being subjected to the fluid pressure at the outlet port 16.

The electrical switch 19, as previously mentioned, includes a conductive closure or plug member 49 threadedly and conductively received in the housing cross-counterbore 18, and a metal terminal 50 extends through said member and is insulated therefrom, said terminal having an exterior end for connection in an electrical circuit of a type well known in the art for selectively energizing a driver warning or dash lamp (not shown). A non-conductive switch operating member 51 is slidably received in a bore 52 provided in the plug member 49, said switch member having a lower end or follower portion 53 extending through the housing cross-bore 17 for engagement with the piston land 26 and having a conductive contact 54 on the upper end portion thereof for electrical engagement with another contact 55 on said plug member. To complete the description of the control valve 1, a current carrying spring 56 is interposed between the interior end of the terminal 50 and the switch member contact 54 urging it toward engagement with the contact 55 and urging the follower portion 53 of the switch member 51 into positioning engagement with the piston land 26.

In the operation with the component parts of the control valve 1 position as shown in FIG. 1 and as described hereinabove, independent or separately supplied input fluid pressure $P_1$, $P_2$ normally having substantially equal magnitudes are supplied upon operator actuation of the split system type master cylinder (not shown) to the inlet ports 13, 14, respectively, of the control valve 1. The input fluid pressure $P_2$ flows from the inlet port 14 into the inlet chamber 24 acting on the switch piston area $A_2$ to establish a force $P_2A_2$, and the input fluid pressure $P_1$ flows from the inlet port 7 into the inlet chamber 23 acting on area $A_1$ to establish a force $P_1A_1$ opposed to the force $P_2A_2$ and also flow through the switch piston passage 32 into the intermediate chamber 40 to establish another force $P_1A_3$ which is opposed to the force $P_1A_1$ and additive to the force $P_2A_2$. Since the area $A_3$ has been previously defined as substantially equal to the difference between the areas $A_1$, $A_2$ and since the input fluid pressures $P_1$, $P_2$ have been previously defined as substantial equal, it is obvious that the force $P_2A_2$ is substantially equal and opposite to the difference between forces $P_1A_1$ and $P_1A_3$; therefore, the switch piston 20 is relatively unaffected by the input fluid pressures $P_1$, $P_2$ acting thereon and will remain substantially in its centered position. The input fluid pressure $P_1$ is applied from the intermediate chamber 40 through the metering piston passage 38 into the output chamber 41 and therefrom to the outlet port 16 to establish an output fluid pressure $Po$. The input fluid pressure $P_1$ acts on the input effective area $A_4$ of the metering piston 33 to establish an input force $P_1A_4$, and the output fluid pressure $Po$ acts on the effective area $A_5$ of said metering piston to establish an output force $PoA_5$ opposed to the input force $P_1A_4$. Since the input and output fluid pressures $P_1$ and $Po$ are initially equal and since the area $A_5$ is greater than the area $A_4$ of the metering piston, it is obvious that the output force $PoA_5$ is greater than the input force $P_1A_4$; however, the compressive force $Fc$ of the metering spring 47 prevents movement of the metering piston 33 until the input and output fluid pressures $P_1$, $Po$ exceed a predetermined value, as shown by the line OB in the graphical representation of FIG. 2. When the predetermined value B of the input and output fluid pressures $P_1$, $Po$ is attained, the output force $PoA_5$ overcomes the additive input and spring forces $P_1A_4$, $Fc$ to move the metering piston 33 from its original position in a rightward direction toward an operative or metering position to store the energy of the spring 47. This rightward movement of the metering piston 33 engages the valve seat 39 thereof with the switch piston valve element 31 to isolate the input fluid pressure $P_1$ in the intermediate chamber 40 from the output fluid pressure $Po$ in the output chamber 41, and upon engagement of said valve seat and valve element the input and spring forces $P_1A_4$, $Fc$ are substantially equal to an balanced by the output force $PoA_5$.

From the grapical representation in FIG. 2, it is obvious that increases in the magnitude of the input fluid pressure $P_1$ in excess of the predetermined value B, as shown by the line BC, will result in proportionally reduced increases in the output fluid pressure $Po$, as shown by the line BD. For instance, when the input fluid pressure $P_1$ is increased to a value in excess of the predetermined value B, the input force $P_1A_4$ is correspondingly increased and additive to the spring force $Fc$ to overcome the output force $PoA_5$; therefore, the metering piston 33 is moved leftwardly toward a metering position disengaging the valve seat 39 thereof from the switch piston valve element 31 to effect a metered application of the increased input fluid pressure $P_1$ through the metering piston passage 38 and the outlet chamber 41 to the outlet port 16 to effect a proportional or ratioed increase in the output fluid pressure $Po$, as shown by the line BD in the graph of FIG. 2 wherein $$Po = \frac{P_1A_4 + Fc}{A_5}$$

Of course, the increased output fluid pressure $Po$ effects a corresponding increase in the output force $PoA_5$, and when the increase output force $PoA_5$ attains an increased value substantially equal to that of the increased input force $P_1A_4$ and the additive spring force $Fc$, the metering piston 33 is again moved rightwardly to reengage the valve seat 39 thereof with the switch piston valve element 31 to again isolate the increased input and output fluid pressures $P_1$, $Po$. It is, of course, obvious that the metering piston 33 will be responsive to further increases in the input fluid pressure $P_1$ to effect further corresponding proportional increases in the output fluid pressure $Po$ in the same manner as previously described, and it should also be noted that as the input fluid pressure $P_1$ is increased the separate input fluid pressure $P_2$ is also equally increased to maintain the additive forces $P_2A_2$ and $P_1A_3$ substantially equal to the opposing force $P_1A_1$ on the switch piston 20 obviating displacement movement thereof from its centered position.

When the split master cylinder is de-actuated, the input fluid pressures $P_1$, $P_2$ are vented to atmosphere, said input fluid pressure $P_1$ flowing from the intermediate chamber 40 through the control piston passage 32 and the inlet chamber 23 to the inlet port 13, and said input fluid pressure $P_2$ flowing from the outlet port 15 through the inlet chamber 24 to the inlet port 14. In this manner, the forces $P_1A_1$, $P_1A_3$ and $P_2A_2$ acting on the switch piston 20, as well as the input force $P_1A_4$ acting on the metering piston 33, are eliminated. When the magnitude of the input fluid pressure $P_1$ is reduced to the value G on the line OBGC in the graph of FIG. 2, which is a value substantially equal to that of the output fluid pressure $Po$, said output fluid pressure $Po$ flows from the outlet port 16 through the outlet chamber 48 and acts on the return valve element 44 of the proportioning piston 33 to displace the outer sealing lip 46 thereof from sealing engagement with the housing counterbore 6, and said output fluid pressure thereafter flows through the piston groove 42 and the return passages 43 into the intermediate chamber 40 and therefrom to the inlet port 13, as previously described, wherein the output forces $A_5Po$ is also eliminated. This return flow of the output fluid pressure $Po$ is illustrated in the graph of FIG. 2 by the dotted line DG and the line GBO.

In the event that a sustained pressure differential is established between the separately supplied input fluid pressures $P_1$, $P_2$ due to a malfunction of the split master cylinder, leaks or the like, wherein the magnitude of the supplied fluid pressure $P_1$ exceeds that of the supplied fluid pressure $P_2$ by a predetermined value, the force $P_1A_1$ acting on the switch piston 20 will, of course, overcome the opposing additive forces $P_2A_2$ and $P_1A_3$ acting thereon and will displace said switch piston from its centered position rightwardly toward its rightward displaced or translated position engaging the switch piston shoulder 30 with the housing shoulder 7 since the reduction of the input fluid pressure $P_2$ effects a corresponding reduction in the force $P_2A_2$. Of course, due to the failure of the input fluid pressure $P_2$, it is desirable to obviate the proportioning function of the proportioning piston 33 in order to attain an unaltered fluid pressure at the outlet port 16, i.e., where $Po$ is equal to $P_1$. It should be noted that the distance of the movement between the switch piston abutment 30 and the housing shoulder 7 plus the movement distance between the proportioning piston valve seat 39 and the control piston valve element 31 is greater than the distance of the movement between the rightward end of the proportioning piston sleeve 34 and the end wall of the closure member bore 11; therefore, it is obvious that when the control piston 20 is in its rightward displaced position, the proportioning piston valve seat 39 cannot engage the control piston valve element 31 to effect a metered application of the input fluid pressure between the input and output ports 13, 16. With the control piston 20 in its rightwardly displaced position, the output force $PoA_5$ will overcome the input force $P_1A_4$ respectively acting on the proportioning piston 33 to effect movement thereof against the spring 47 toward a disabled position abuttingly engaging the rightward end of the proportioning piston sleeve member 34 with the end wall of the closure member bore 11; however, as previously mentioned, this movement of the proportioning piston to its disabled position cannot engage the valve seat 39 thereof with the switch piston valve element 31 so that the proportioning piston passage 38 remains open to permit the unmetered or unrestricted flow of the input fluid pressure $P_1$ to the output port 16 wherein $Po$ and $P_1$ are equal.

The movement of the switch piston 20 into its rightwardly displaced position displaces the positioning land 26 from beneath the housing cross-bore 17 and aligns the locking groove 27 therewith, and thereafter the compressive force of the switch spring 56 displaces the follower end 53 of the switch operating member 51 downwardly into the housing bore 5 and into locking engagement with the locking groove 27 to prevent the return movement of said switch piston toward its centered position in response to the compressive force of the centering spring 25a when the split system master cylinder is de-actuated to eliminate the input fluid pressures $P_1$, $P_2$. This downward movement of the switch operating member 51 also engages the contact 54 thereof with the cooperating contact 55 of the switch plug member 49 to complete the electrical circuit and energize the driver warning dash lamp (not shown). In order to re-center the switch piston 20 when the fluid pressure deficiency of the system is corrected, the plug member 49 of the switch 19 is threadedly disengaged from the housing cross-counterbore 18 to disengage the follower end 53 of the switch operating member 51 from locking engagement with the locking groove 27, and the centering spring 25a thereafter returns the switch piston 20 to its centered position with the positioning land thereof beneath the housing cross-bore 17 for positioning engagement with the switch operating member follower end 53 when the switch plug member 49 is manually reengaged with the housing cross-counterbore 18.

In the event that an oppositely directed differential is established between the input fluid pressures due to a malfunction of the split system master cylinder, leaks or the like, wherein the magnitude of the supplied fluid pressure $P_2$ exceeds that of the supplied fluid pressure $P_1$ by a predetermined value, the force $P_2A_2$ and the reduced additive force $P_1A_3$ acting on the switch piston 20 will, of course, overcome the opposing reduced force $P_1A_1$ acting thereon to move said piston from its centered position toward its leftward displaced or translated position since the reduction of the supplied fluid pressure $P_1$ effects a corresponding reduction in the opposing forces $P_1A_1$ and $P_1A_3$. This leftward displacement of the switch piston 20 initially engages the valve element 31 thereof with the proportioning piston valve seat 39 and thereafter moves the proportioning piston 33 against the return spring 48 into abutting engagement with the housing shoulder 8. This leftward movement of the switch piston 20 to its leftward displaced position disengages the positioning land 26 from the follower end 53 of the switch operating member 51 to permit displacement thereof by the compressive force of the switch spring 56 into locking engagement with the locking groove 29a to maintain said switch piston 20 in its leftward displaced position against the compressive force of the centering spring 25. Of course, the downward movement of the switch operating member again will move the contact 54 thereof into engagement with its cooperating contact 55 to complete the electrical circuit and energize the driver warning lamp.

Referring now to FIG. 3, the proportioning piston 133 is shown having substantially the same component parts and functioning in the control valve 1 in substantially the same manner as the previously described proportioning piston 33 with the following exceptions.

The stepped passage 37 of the control piston 133 is threaded at its rightward end to threadedly receive an end plug 134 therein defining the rightward end of the intermediate chamber 40, and the end cap 10 is provided with a vent port 135, if desired, to connect the bore 11 thereof with the atmosphere. The proportioning piston 133 is provided with a radially extending flange 136 for sliding and guiding engagement with the housing bore 8, and an annular peripheral groove 137 is provided in said flange. The sealing member or valve element 44 is received in the groove 137 having its inner lip 45 in sealing engagement with the base of said groove and its outer lip 46 in sealing engagement with the housing counterbore 6. The metering spring 47 is biased between the flange 136 and the closure member 10, and a return fluid pressure passage 138 is defined between the peripheral portion of the flange 136 and the housing counterbore 8 across the valve element 44 and the leftward and rightward faces of said flange, and a plurality of radially extending passages 139 are provided through the sleeve portion 34 of the piston 133 to connect the intermediate chamber 40 with the return passage 138. It should be noted that the piston 133 is provided with an annular effective area $A_6$ defined between the periphery of the sleeve 34 and the housing counterbore 6 and responsive to the input fluid pressure $P_1$. The piston 133 is also provided with an annular effective area $A_7$ substantially defined between the piston passage 38 and the housing counterbore 6 and responsive to the output fluid pressure $Po$ at the outlet port 16, said area $A_7$ being opposed to and predeterminately greater than the area $A_6$.

The operation of the proportioning piston 133 is substantially the same as that previously described for the proportioning piston 33 wherein the output fluid pressure $Po$ in excess of the predetermined value B (as shown in the graph of FIG. 2) acts on the effective area $A_7$ to establish a force $PoA_7$ which is effective to move the proportioning piston 133 rightwardly against the input fluid pressure $P_1$ acting on the effective area $A_6$ to establish the input force $P_1A_6$ and the spring force $Fc$ which is additive thereto. This rightward movement of the proportioning piston 133 engages the valve seat 39 thereof with the switch piston valve element 31 to isolate the input fluid pressure $P_1$ from the output fluid pressure $Po$. Further increases in the input fluid pressure above the predetermined value B will increase the input force $P_1A_6$ to effect a metered increase in the magnitude of the output fluid pressure $Po$, as previously described. When the split system master cylinder is de-actuated to vent the input fluid pressure $P_1$ to atmosphere, the reduction of the input fluid pressure $P_1$ to a value substantially equal to or less than the value G (as shown in the graph of FIG. 2) effects return flow of the output fluid pressure $Po$ from the output port 16 through the outlet chamber 41 past the seal 44 through the return passage 138, the housing counterbore 6 and the proportioning piston crosspassage 139 into the intermediate chamber 40 and therefrom to the inlet port 13 wherein the output force $PoA_7$ is eliminated. Upon elimination of the output force $PoA_7$, the spring 47 returns the piston 33 to its original position with the valve seat 39 thereof disengaged from the switch piston valve element 31.

From the foregoing, it is now apparent that a control valve meeting the objects and advantageous features set forth hereinbefore, as well as other objects and advantageous features, is provided and that changes as to the precise configurations, shapes or other details of the construction set forth in the disclosure by way of illustration may be made by those skilled in the art without departing from the spirit of the invention.

The embodiments of the invention in which an exclusive property or privilege is claimed are defined as follows:

1. A control valve comprising a housing, a pair of metering members relatively movable in said housing for controlling the application through said housing of fluid pressure supplied thereto, one of said metering members being initially movable in response to the supplied and applied fluid pressures of a predetermined value acting thereon toward a position in metering engagement with the other of said metering members to isolate the supplied fluid pressure from the applied fluid pressure and being thereafter further movable in response to increases in the isolated supplied fluid pressure toward another position disengaged from said other metering member to effect a metered increase in the applied fluid pressure in a predetermined ratio with the increased supplied fluid pressure in excess of the predetermined value, and said other metering member being movable from a normal position in said housing for the metering engagement with said one metering member relative to said one metering member in response to the supplied fluid pressure acting thereon toward a translated position in said housing displaced from said one metering member to effect an unmetered application through said housing of the supplied fluid pressure upon the failure of another fluid pressure separately supplied to said housing, the other supplied fluid pressure normally being substantially equal to said first named supplied fluid pressure and acting on said other metering member in opposition to the first named supplied fluid pressure to normally urge said other metering member toward its normal position.

2. The control valve according to claim 1, comprising a pair of opposed differential areas on said one metering member respectively subjected to the first named supplied fluid pressure and the applied fluid pressure, said one metering member being movable in response to the first named supplied fluid pressure and applied fluid pressure of the predetermined value acting on said opposed differential areas toward its metering engagement position and being thereafter further movable toward its other position in response to the increased first named supplied fluid pressure acting on one of said differential areas to effect the metered increase in the applied fluid pressure acting on the other of said differential areas in the predetermined ratio with the increased first named supplied fluid pressure in excess of the predetermined value, and other opposed effective areas on said other metering member respectively subjected to the first named supplied fluid pressure and the other supplied fluid pressure, said other metering member being movable toward its translated position in said housing to effect the unmetered application of the first named supplied fluid pressure therethrough in response to a predetermined differential between the magnitudes of the first named and other supplied fluid pressures respectively acting on said other effective areas.

3. The control valve according to claim 1, comprising passage means in said one metering member for return flow of the applied fluid pressure, and valve means in said passage means for controlling the return flow of the applied fluid pressure therethrough, said valve means being movable toward a position in said passage means establishing the return flow of the applied fluid pressure therethrough in response to the reduction of the first named supplied fluid pressure to a value less than that of the applied fluid pressure when said one metering member is in its metering engagement position.

4. The control valve according to claim 2, wherein one of said differential areas is predeterminately larger than the other thereof, said one and other differential areas being respectively responsive to the applied and first named supplied fluid pressures wherein the applied fluid pressure in excess of the predetermined value increases at a metered rate predeterminately less than the supplied fluid pressure in excess of the predetermined value.

5. The control valve according to claim 1, wherein said one metering member includes other means for controlling the return flow of the applied fluid pressure, said other means being responsive to the reduction of the first named supplied fluid pressure to a magnitude at least equal to that of the applied fluid pressure to establish the return flow of the applied fluid pressure when said one metering member is in its metering engagement position.

6. The control valve according to claim 1, comprising resilient means opposing movement of said one metering member toward its metering engagement position, the stored force of said resilient means when said one metering means is in its metering engagement position being effective to assist movement of said one metering member from its metering engagement position toward its other position.

7. The control valve according to claim 1, comprising abutment means on said housing for engagement with said one metering member, said one metering member being movable into engagement with said abutment means in response to the unmetered application of the first named supplied fluid pressure acting thereon to obviate metering engagement with said other metering member when said other metering member is in its translated position.

8. The control valve according to claim 1, wherein said other metering member includes valve means for engagement with said one metering member, said one metering member being engaged with said valve means upon the movement of said one metering member to its metering engagement position and being disengaged from said valve means upon the movement of said one metering member to its other position, and said valve means being displaced from engagement with said one metering member upon the movement of said other metering member to its translated position.

9. The control valve according to claim 1, wherein said one metering member includes a pressure fluid flow passage therethrough, said flow passage being closed to isolate the first named supplied fluid pressure from the applied fluid pressure upon the movement of said one metering member to its metering engagement position and being thereafter opened to effect the metered increase in the applied fluid pressure upon the movement of said one metering member to its other position, and said flow passage also being open to effect the unmetered application therethrough of the one supplied fluid pressure upon the movement of said other metering member to its translated position.

10. The control valve according to claim 1, wherein said one metering member includes a pressure fluid flow passage therethrough, and valve means on said other metering member for engagement with said one metering member to control said flow passage, said one metering member being engaged with said valve means to close said flow passage and isolate the first named supplied fluid pressure from the applied fluid pressure upon the movement of said one metering member to its metering engagement position and being thereafter disengaged from said valve means to effect the metered increase in the applied fluid pressure upon the movement of said one metering member to its other position, and said valve means being movable with said other metering member to its translated position and displaced from engagement with said one metering member to open said flow passage and effect the unmetered application therethrough of the one supplied fluid pressure.

11. The control valve according to claim 10, comprising a valve seat on said one metering member about said flow passage for engagement with said valve means, said valve seat being movable into and out of engagement with said valve means to close and open said flow passage upon the movement of said one metering member to its metering engagement position and other position, respectively, and said valve means also being displaced from engagement with said valve seat to open said flow passage and effect the unmetered application of the one supplied fluid pressure therethrough upon the movement of said other metering member to its translated position.

12. The control valve according to claim 2, comprising resilient means opposing movement of said one metering member toward its metering engagement position, one of said differential areas being predeterminately greater than the other thereof, said one and other differential areas being respectively responsive to the applied and first named supplied fluid pressures, and the stored force of said resilient means when said one metering member is in its metering engagement position being additive to the force of the increased first named supplied fluid pressure in excess of the predetermined value acting on said other differential area to move said one metering member toward the other position to effect the metered increase in the applied fluid pressure acting on said one differential area.

13. The control valve according to claim 12, comprising passage means in said one member for return flow of the applied fluid pressure, valve means controlling said passage means and normally urged to a closed position therein when the magnitude of the first named supplied fluid pressure acting thereon exceeds that of the applied fluid pressure acting thereon, said valve means being movable toward an open position in said passage means to effect the return flow of the applied fluid pressure therethrough in response to a reduction of the magnitude of the first named supplied fluid pressure to a value less than that of the applied fluid pressure when said one metering member is in its metering engagement position, and the stored force of said resilient means being effective to move said one metering member toward its original position out of metering engagement with said other metering member when the magnitudes of the applied fluid pressure and first named supplied fluid pressure acting on said one and other differential areas are reduced to a value less than the predetermined value.

14. The control valve according to claim 12, comprising abutment means on said housing for engagement with said one metering member, said one metering member being movable against said resilient means into engagement with said abutment means in response to the unmetered application of the first named supplied fluid pressure acting on said one and other differential areas to obviate metering engagement of said one metering member with said other metering member when said other metering member is in its translated position.

15. The control valve according to claim 12, wherein said one metering member includes piston means movable in said housing, pressure fluid flow passage means in said piston means, a valve seat on said piston means about said passage means for engagement with said other metering member, said differential areas being on said piston means, said resilient means including a spring engaged between said piston means and housing and normally urging said valve seat from engagement with said other metering member, said piston means being movable against the force of said spring means in response to the first named supplied and applied fluid pressures of the predetermined value respectively acting on said differential areas toward its metering engagement position to engage said valve seat with said other metering member closing said passage means to isolate the first named supplied fluid pressure from the applied fluid pressure, and said piston means being thereafter further movable toward its other position in response to the increased first named supplied fluid pressure in excess of the predetermined value acting on said other differential area and assisted by the force of said spring to disengage said valve seat from said other metering member opening said passage means to effect the metered increase in the applied fluid pressure acting on said one differential area in the predetermined ratio with the increased first named supplied fluid pressure in excess of the predetermined value.

16. The control valve according to claim 15, comprising other passage means in said piston means having one end intersecting with said first named passage means for subjection to the first named supplied fluid pressure and the other end thereof connected with the applied fluid pressure, and sealing means between said piston means and said housing for controlling the return flow of applied fluid pressure through said other passage means including a sealing portion normally urged toward sealing engagement with said housing to close said other passage means in response to the first named supplied fluid pressure acting thereon having a greater magnitude than the applied fluid pressure and said sealing portion being urged toward a position disengaged from said housing to effect the return flow of the applied fluid pressure therethrough in response to a reduction in the magnitude of the first named supplied fluid pressure to a value less than that of the applied fluid pressure when said valve seat is engaged with said other metering means.

17. The control valve according the claim 15, comprising valve means on said other metering member for engagement with said valve seat to close said passage means when said piston means is in its metering engagement position, and said valve means being displaced from engagement with said valve seat to open said passage means and effect the unmetered application of the first named supplied fluid pressure therethrough upon the movement of said other metering member toward its translated position.

18. The control valve according to claim 17, wherein said other metering means includes other piston means movable in said housing from its normal position toward its translated position and another opposed translated position in response to a predetermined differential between the first named and other supplied fluid pressures acting on said opposed effective areas, respectively, extension means on said piston means extending into said passage means and having a free end portion thereon defining said valve means, and other passage means in said piston means for the first named supplied fluid pressure extending through said free end portion and connecting with said first named passage means.

19. A control valve comprising a housing, means for comparing the magnitude of separate fluid pressures supplied thereto and movable in said housing toward opposed displaced positions in response to a predetermined differential between the magnitudes of the separately supplied fluid pressures acting thereon, a valve seat on said first named means, other means movable in said housing for metering engagement with said valve seat to control the application through said housing of one of the supplied fluid pressures, a pair of opposed effective areas on said other means respectively subjected to the one supplied fluid pressure and the applied fluid pressure, said other means being movable toward a metering position in engagement with said valve seat to isolate the one supplied fluid pressure from the applied fluid pressure when the magnitudes thereof respectively acting on said areas attain a predetermined value, and resilient means opposing movement of said other means toward its metering position, said other means being subsequently movable in response to the stored energy of said resilient means and a further increase in the one supplied fluid pressure in excess of the predetermined value acting on one of said areas toward a position disengaged from said valve seat to effect a metered increase of the applied fluid pressures acting on the other of said areas in a predetermined ratio with the increase in the supplied fluid pressure in excess of the predetermined value, and said first named means being movable toward one of its displaced positions when the magnitude of one of the one supplied fluid pressure and the other of the supplied fluid pressures exceeds that of the other of the one and other supplied fluid pressures by the predetermined differential to move said valve seat toward a non-metering position disengaged from said other means and obviate the metering effect thereof on the one supplied fluid pressure.

20. A control valve comprising a housing having three ports therein, first means movable in said housing between two of said ports for comparing the magnitudes of the fluid pressures at said two ports, a valve member on said first means, resiliently urged means movable in said housing for metering engagement with said valve member and normally disengaged therefrom to establish pressure fluid communication between one of said two ports and said third port, a pair of opposed areas in said resiliently urged means respectively subjected to the fluid pressure at said one of said two ports and said third port, said resiliently urged means being initially movable into engagement with said valve member to interrupt pressure fluid comunication between said one of said two ports and said third port when the fluid pressures thereat acting on said opposed areas attain a predetermined value and said resiliently urged means being subsequently movable in response to increases in the fluid pressure at said one of said two ports in excess of the predetermined value acting on one of said opposed areas toward a metering position disengaged from said valve member to meter fluid pressure from said one of said two ports to said third port and effect a metered increase in the fluid pressure at said third port, the metered increase in the fluid pressure at said third port acting on the other of said opposed areas to oppose further movement of said resiliently urged means and urge said resiliently urged means toward re-engagement with said valve member, and another pair of opposed areas on said first means respectively subjected to the fluid pressure at said one of said two ports and the other of said two ports, said first means being movable in response to a predetermined differential between the magnitudes of the fluid pressure at said one and other of said two ports respectively acting on said other pair of opposed areas to move said valve member toward a disabled position disengaged from said resiliently urged means and establishing open pressure fluid communication between said one of said two ports and said third port.

21. The control valve according to claim 20, comprising passage means in said resiliently urged means between said one of said two ports and said third port, and check valve means normally closing said passage means, said check valve means being movable toward an open position in said passage means to communicate said third port with said one of said two ports when the magnitude of the fluid pressure at said one of said two ports in excess of the predetermined value is reduced to another value less than the magnitude of the fluid pressure at said third port.

22. The control valve according to claim 20, comprising abutment means in said housing for engagement with said resiliently urged means, said resiliently urged means being movable into engagement with said abutment means in response to the fluid pressures at said one of said two ports and said third port respectively acting on said one and other of said first named pair of opposed areas to obviate engagement of said resiliently urged means with said valve member upon the movement of said valve member to its disabled position.

23. The control valve according to claim 20, wherein said other of said first named pair of opposed areas is predeterminately greater than said one of said first named pair of opposed areas.

24. The control valve according to claim 20, comprising passage means in said resiliently urged means and connected between said one of said two ports and said third port, said passage means being closed to interrupt pressure fluid communication between said one of said two ports and said third port upon the movement of said resiliently urged means into engagement with said valve member and being thereafter opened to establish the metered pressure fluid communication between said one of said two ports and said third port upon the movement of said resiliently urged means to its metering position disengaged from said valve member, and said passage means also being open to establish the open pressure fluid communication between said one of said two ports and said third port upon the movement of said valve member to its disabled position.

25. The control valve according to claim 24, comprising a valve seat on said resiliently urged means about said passage means for engagement with said valve member.

26. The control valve according to claim 24, comprising abutment means on said housing for engagement with said resiliently urged means to predeterminately limit movement of said resiliently urged means toward said first means, said resiliently urged means being movable into engagement with said abutment means in response to the fluid pressures at said one of said two ports and said third port respectively acting on said one and other of said first named pair of opposed areas to prevent engagement of said resiliently urged means with said valve member and maintain said passage means connected in open pressure fluid communication between said one of said two ports and said third port when said valve member is in its disabled position.

27. The control valve according to claim 24, wherein said resiliently urged means includes piston means slidable in said housing, a pair of opposed portions on said piston means respectively defining said first named pair of opposed areas, said passage means being in said piston means and connected between said opposed portions, a valve seat on said piston means about said passage means for engagement with said valve member, and resilient means urging said piston means toward a position disengaging said valve seat from said valve member to normally establish pressure fluid communication between said one of said two ports and said third port through said passage means, said piston means being movable against the force of said resilient means to engage said valve seat with said valve member closing said passage means and interrupting pressure fluid communication between said one of said two ports and said third port when the fluid pressures at said one of said two ports and said third port respectively acting on said first named pair of opposed areas attain the predetermined value and said piston means also being thereafter further movable toward its metering position in response to the force of said resilient means and the increased fluid pressure at said one of said two ports in excess of the predetermined value acting on one of said first named pair of opposed areas to disengage said valve seat from said valve member and open said passage means establishing the metered pressure fluid communication therethrough between said one of said two ports and said third port to effect the metered increase in the fluid pressure at said third port acting on the other of said first named pair of opposed areas, and abutment means in said housing for engagement with said piston means, said piston means being movable into engagement with said abutment means in response to the fluid pressures at said one of said two ports and said third port respectively acting on said one and other of said first named pair of opposed areas to obviate the engagement of said valve seat with said valve member and establish the open pressure fluid communication through said passage means between said one of said two ports and said third port upon the movement of said valve member to its disabled position.

28. The control valve according to claim 27, wherein said other of said first named pair of opposed areas is predeterminately greater than said one of said first named pair of opposed areas, and one of said opposed portions of said piston means including radially extending flange means, said other of said first named pair of opposed areas being defined on said flange means and said one of said first named pair of opposed areas being defined on the other of said opposed portions of said piston means.

29. The control valve according to claim 27, comprising other abutment means in said housing, said resilient means including a spring connected between said other abutment means and said piston means.

30. A control valve comprising a housing, switch actuating means movable in said housing and defining therewith opposed first and second chambers for respective subjection to separately supplied fluid pressures, piston means movable in said housing and defining therewith third and fourth fluid pressure chambers, said switch actuating means including means extending into one of said third and fourth chambers, a valve element on said included means in said one of said third and fourth chambers, and passage means connecting one of said first and second chambers with said one of said third and fourth chambers, a valve seat on said piston means between said third and fourth chambers for metering engagment with said valve element, spring means engaged with said piston means and normally urging said valve seat toward a position disengaged from said valve element establishing open pressure fluid communication between said third and fourth chambers, and a pair of opposed differential areas on said piston means respectively subjected to fluid pressure in said third and fourth chambers, said piston means being initially movable against said spring means to store the energy thereof in response to supplied fluid pressure of a predetermined value in said one of said one of said first and second chambers acting on said opposed areas to engage said valve seat with said valve element and interrupt pressure fluid communication between said third and fourth chambers, and said piston means being thereafter further movable in response to the stored energy of said spring means and increases in the supplied fluid pressure in said one of said first and second chambers in excess of the predetermined value acting on one of said opposed areas toward a metering position disengaging said valve seat from said valve element to establish metered pressure fluid communication between said third and fourth chambers and increase the fluid pressure in excess of the predetermined value in the other of said third and fourth chambers acting on the other of said opposed areas at a rate less than the increase of the supplied fluid pressure in excess of the predetermined value in said one of said first and second chambers, and another pair of opposed areas on said switch actuating piston respectively responsive to the supplied fluid pressure in said one of said first and second chambers and the other of said first and second chambers, said switch actuating piston being movable in response to a predetermined differential between the magnitudes of the supplied fluid pressures respectively acting on said last named pair of areas to move said valve element into a disabled position disengaged from said valve seat thereby effecting open pressure fluid communication between said third and fourth chambers and obviating the metering actuation of said piston means.

31. A control valve comprising a housing, first means movable in said housing and defining therewith opposed first and second chambers for respective subjection to separately supplied fluid pressures, second means movable in said housing and defining therewith third and fourth fluid pressure chambers, third means on said first means extending into said third chamber, fourth means on said second means between said third and fourth chambers for metering engagement with said third means, fifth means biased between said housing and said second means and normally urging said fourth means toward a position disengaged from said third means establishing open pressure fluid communication between said third and fourth chambers, sixth means in said first means connecting one of said first and second chambers in open pressure fluid communication with said third chamber, a pair of opposed differential areas on said second means respectively subjected for fluid pressure in said third and fourth chambers, said second means being initially movable against the biasing force of said fifth means in response to supplied fluid pressure in said one of said first and second chambers at a predetermind value acting on said pair of opposed areas to engage said fourth means with said third means and interrupt pressure fluid communication between said third and fourth chambers, and said second means being thereafter further movable in response to the biasing force of said fifth means and increases in the supplied fluid pressure in excess of the predetermined value in said one of said first and second chambers acting on one of said areas toward a metering position disengaging said fourth means from said third means to establish metered pressure fluid communication between said third and fourth chambers and increase the fluid pressure in excess of the predetermined value in said fourth chamber acting on the other of said areas at a rate less than that of the increased supplied fluid pressure in said one of said first and second chambers, and another pair of opposed areas on said first means respectively subjected to the supplied fluid pressures in said first and second chambers, said first means being movable in response to a predetermined differential between the magnitudes of the supplied fluid pressures in said first and second chambers acting on said first named pair of areas to move said third means toward a disabled position disengaged from said fourth means to effect open pressure fluid communication between said third and fourth chambers and obviate the metering actuation of said second means.

32. A control valve comprising a housing having a bore therein interposed between opposed counterbores, a pair of input ports in said housing connecting with one of said counterbores, a switch piston slidable in said one counterbore between said input ports, a pair of opposed areas on said switch piston respectively subjected to separate fluid pressures at said input ports, another piston slidable in the other of said counterbores, a shoulder in said housing between said housing bore and other counterbore, a pair of stepped bores in said other piston connecting with said other counterbore, a valve seat on said other piston between said stepped bores, extension means on said switch piston slidable in said housing bore and extending through said other counterbore and one of said stepped bores into the other of said stepped bores, said extension means having a free end portion in said other stepped bore defining valve means for metering engagement with said valve seat, a spring engaged between said housing and said other piston means urging said valve seat from said valve means, an output port in said housing connecting with said other counterbore between said shoulder and said other piston means, passage means in said switch piston and extension means providing the passage therethrough of established fluid pressure at one of said input ports to said output port when said valve seat is disengaged from said valve means, a pair of opposed differential areas on said other piston respectively subjected to fluid pressure at said one input and said output port, said other piston being initially movable in one direction against said spring to store the energy thereof in response to established fluid pressure of a predetermined value at said one input port and said output port respectively acting on said opposed areas to engage said valve seat with said valve means interrupting pressure fluid communication between said one input port and said output port, and said other piston being thereafter further movable in a direction opposite to the one direction toward a metering position in response to the stored energy of said spring and increases in the fluid pressure in excess of the predetermined value at said one input port acting on one of said opposed areas to disengage said valve seat from said valve element and effect a metered increase in the fluid pressure at said output port acting on the other of said opposed areas at a rate less than that of the increased fluid pressure at said one input port, another pair of opposed effective areas on said switch piston and on the free end of said extension means respectively subjected to the fluid pressure at said one input port, and a fifth area on said switch piston opposed to one of said last named pair of areas and substantially equal to the difference therebetween and subjected to established fluid pressure at the other of said input ports, said switch piston being movable in the one direction to move said valve means toward a disabled position disengaged from said valve means to effect open pressure fluid communication between said one input port and said output port and obviate the metering actuation of said other piston when the magnitude of the fluid pressure at said other input port acting on said fifth area is reduced to a value predeterminately less than that of the fluid pressure at said one input port acting on said last named pair of areas.

References Cited

UNITED STATES PATENTS

| 3,162,491 | 12/1964 | Van Winsen | 303—22 X |
| 3,169,800 | 2/1965 | Oberthur | 303—22 |
| 3,283,504 | 11/1966 | Stelzer | 303—6 X |
| 3,315,469 | 4/1967 | Stelzer | 303—6 X |

MILTON BUCHLER, Primary Examiner.

J. McLAUGHLIN, JR., Assistant Examiner.

U.S. Cl. X.R.

60—54.5; 137—87, 508; 188—151, 152; 200—82; 303—84